May 3, 1966      H. HURVITZ      3,249,724

ELECTRO-CAPILLARY SWITCH

Filed Dec. 13, 1962

INVENTOR
HYMAN HURVITZ

BY *Hurvitz & Rose*

ATTORNEYS

United States Patent Office 3,249,724
Patented May 3, 1966

3,249,724
ELECTRO-CAPILLARY SWITCH
Hyman Hurvitz, 1313 Juniper St. NW., Washington, D.C.
Filed Dec. 13, 1962, Ser. No. 244,454
2 Claims. (Cl. 200—152)

The present invention relates generally to electro-capillary switches.

The phenomenon of electro-capillary is known. It involves generation of a force when current flows from one to another conductive liquid in a capillary tube, the force being a surface tension force at the boundary between the liquids. According to the invention two capillary columns of mercury are separated by a globule of electrolyte, to form an electro-capillary motor. If potential is applied across the columns the globule moves, moving the columns, and the direction of movement is the same as the direction of current. Stationary electrodes are provided which are contacted by the columns, when moved, to close a power circuit to a load.

It is, accordingly, an object of the invention to provide various forms of mercury switches, employing the electro-capillary phenomenon to move the mercury.

It is a further object of the invention to provide a mercury switch responsive to electrical signal which does not require a magnetic plunger or armature, nor a magnetic circuit.

The above and still further objects, features and advantages of the present invention will become apparent upon consideration of the following detailed description of one specific embodiment thereof, especially when taken in conjunction with the accompanying drawings, wherein:

FIGURES 1–5 illustrate in longitudinal section various forms of electro-capillary mercury switches, according to the invention.

Figure 1:
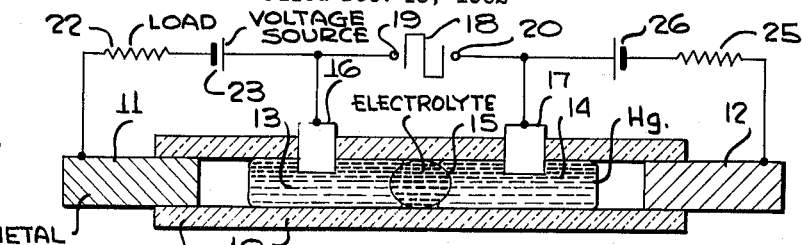

Referring now to the drawings, the reference numeral 10, FIGURE 1, denotes a capillary cylinder of glass, the ends of which are plugged by metallic terminals 11 and 12. Within the tube 10 are two capillary columns of mercury 13 and 14, separated by a globule 15 of weak electrolyte, i.e. HCl solution, for example. Electrodes 16 and 17 extend into the mercury column. To the electrodes 16, 17 may be applied a switching voltage 18, at terminals 19, 20, selectively of opposite polarities. If terminal 19 is positive relative to 20 the columns 13, 14 will move to the right, and if terminal 20 is positive relative to terminal 19, the columns will move to the left, as seen in FIGURE 1.

Connected between terminal 16 and terminal 11 is a load 22 and a power source 23. Similarly, between terminals 17 and 12 are a load 25 and a power source 26.

On application of plus voltage to terminal 20 the column 13 moves left into contact with terminal 11, completing a circuit for load 22, from source (battery) 23. It terminal 19 is plus, the circuit of load 26 is completed. Once circuits are completed, they may be broken by reversing the voltage at terminals 19, 20. Sources 23, 26 may have their common electrode, i.e. plus, connected to electrodes 16, 17, and may be equal in voltage, to avoid circulating leakage currents from batteries 23, 26, if desired.

Figure 2:
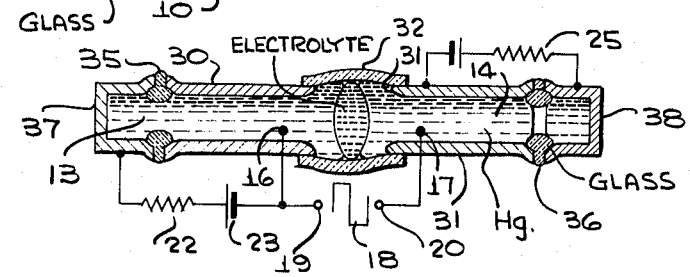

In FIGURE 2, the load and switching arrangement is like that in FIGURE 1. A metallic envelope is employed, composed of four segments separated by insulators. The segments 30, 31 are separated by glass ring 32. The globule of electrolyte 15 always rides on the insulating ring 32, as it moves right or left, to permit application of voltage thereacross.

Secured to the open ends of cylinders 30, 31, by means of insulating rings 35, 36 are metallic cups 37, 38. The metal employed is mercury wettable, but the insulating rings are not. Sufficient mercury is included in the structure to fill it completely except for one of the rings 35, 36. On this basis a gap will exist in the total mercury column at one of the rings, since this is a point at which no surface tension exists. As the globule 25 moves left or right, the rings 35, 36 are selectively covered and uncovered. All four electrodes are mercury electrodes, but surface tension forces will retain the switch in its last actuated condition, despite position, orientation, shock or vibration.

Figure 3:
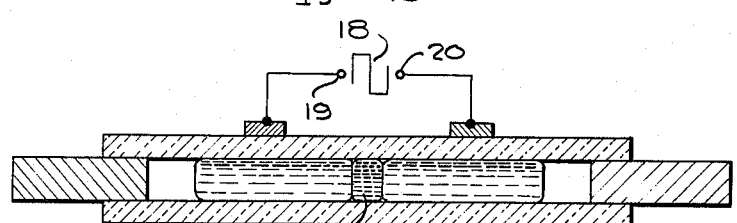

FIGURE 3 is like FIGURE 1 except in that electrodes 38, 39 are etxernal of glass cylinder 10, so that the current to the globule 15 follows a capacitive path. Thereby, the construction of the system is simplified, in terms of limiting the number of electrodes passing through glass.

Figure 4:
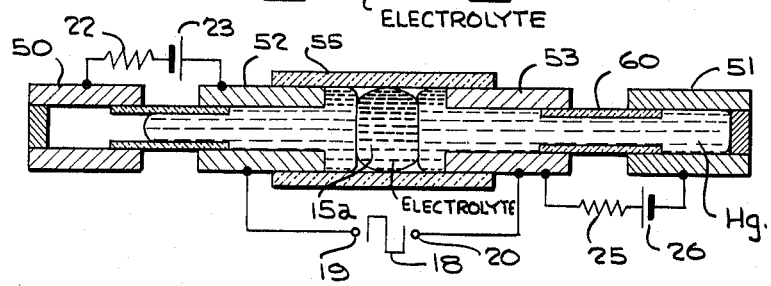
Figure 5:
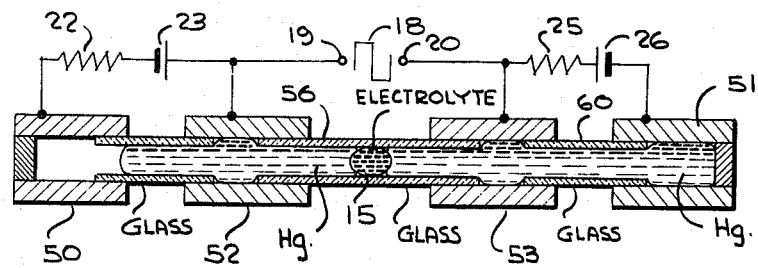

FIGURES 4 and 5 illustrate alternative but related systems of electro-capillary switching, employing mercury contacts. Both systems use metal electrodes 52, 53 for applying current to globule 15, 15a. Electrode 53 is separated from electrode 51 by a glass tube 60, which fits into electrodes 51, 53. Electrode 53 is separated from electrode 52 by an external glass tube 55, in FIGURE 4, whereas in FIGURE 5 an external glass tube 56 is employed. Tubes 55 and 56 are capillary tubes.

The species of FIGURE 4 has an advantage in that globule 15a represents a large piston operating on a small column of mercury in tube 60, so that a small movement of globule 15a results in a large movement of the mercury in tube 60. This is not true of FIGURE 5, which, on the other hand, is easier to construct, being in capillary size throughout. The system of FIGURES 4 and 5 are entirely parallel to the system of FIGURE 2, in principle, indicating an alternative mode of fabricating the insulating rings of FIGURE 2.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. An electro-capillary switch, comprising first, second, third and fourth conductive capillary mercury wettable tubes, insulating mercury unwettable rings separating said first tube from said second tube, said second tube from said third tube and said third tube from said fourth tube, said first and fourth tubes including electrical contacts, a first column of mercury filling said first tube, said first ring and said second tube, a second column of mercury filling said third tube and said fourth tube, said third ring only being empty of mercury, a quantity of electro-capillary electrolyte in said second ring in contact with said mercury in said second and third tubes and maintaining said first column of mercury separated from said second column of mercury, and means for applying voltage between said second and third tubes whereby said mercury may be caused to move into and out of electrical engagement with said contacts.

2. An electro-capillary switch, comprising first and second conductive mercury wettable capillary tubes, first and second mercury wettable contacts, insulating mercury unwettable rings separating said first contact from said first tube, said first tube from said second tube, and said second tube from said second contact, a first column of mercury filling said first tube, a second column of mercury filling said second tube, a globule of electrocapillary electrolyte contained within said ring separating said first and second tubes and maintaining said first and second columns of mercury separated, and means for applying voltage between said first and second tubes whereby said mercury may be caused to move into and out of electrical engagement with said contacts.

References Cited by the Examiner

UNITED STATES PATENTS

| | | | |
|---|---|---|---|
| 669,149 | 3/1901 | Crehore et al. | 324—94 |
| 3,045,178 | 7/1962 | Corrsin | 200—152 X |
| 3,071,673 | 1/1963 | Marton | 200—152 |
| 3,161,750 | 12/1964 | Bourdel | 200—152 |

ROBERT K. SCHAEFER, *Primary Examiner.*

KATHLEEN H. CLAFFY, *Examiner.*